(12) United States Patent
Zwettler et al.

(10) Patent No.: US 6,318,659 B1
(45) Date of Patent: Nov. 20, 2001

(54) TAPE REEL ASSEMBLY WITH HUB SLEEVE FOR A DATA STORAGE TAPE CARTRIDGE

(75) Inventors: Christopher J. Zwettler, Lake Elmo; Daniel C. Egan, Oakdale, both of MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/604,489

(22) Filed: Jun. 27, 2000

(51) Int. Cl.[7] .................................................. G03B 23/02
(52) U.S. Cl. ........................... 242/348; 242/345; 360/132
(58) Field of Search ..................................... 242/348, 345, 242/345.2, 345.3, 358.1, 597.6; 360/132

(56) References Cited

U.S. PATENT DOCUMENTS

| | | |
|---|---|---|
| 1,111,506 | * 9/1914 | Tessier . |
| 2,622,941 | * 12/1952 | Edwards . |
| 3,404,848 | * 10/1968 | Fundingsland . |
| 3,691,921 | * 9/1972 | Isbell . |
| 4,561,609 | * 12/1985 | Collins et al. . |
| 5,027,249 | 6/1991 | Johnson et al. . |
| 5,092,537 | * 3/1992 | Eggebeen . |
| 5,297,755 | 3/1994 | Felde et al. . |
| 5,316,235 | 5/1994 | East et al. . |
| 5,328,117 | 7/1994 | Teuber et al. . |
| 5,366,173 | 11/1994 | Lammers et al. . |
| 5,492,282 | * 2/1996 | Okuchi et al. . |
| 5,513,815 | 5/1996 | Erickson et al. . |
| 5,522,562 | * 6/1996 | Stanley et al. . |
| 5,564,647 | 10/1996 | Bay et al. . |
| 6,040,966 | 3/2000 | Erickson . |

* cited by examiner

Primary Examiner—William A. Rivera
(74) Attorney, Agent, or Firm—Eric D. Levinson

(57) ABSTRACT

A tape reel assembly for use with a data storage tape cartridge. The data storage tape cartridge includes a housing, a tape reel pin, the tape reel assembly, and a storage tape. The housing includes a first housing section and a second housing section. The tape reel pin extends in a generally perpendicular fashion relative to an interior surface of the first housing section. With this configuration, the tape reel pin forms a cylindrical side surface and terminates in a leading end. The tape reel assembly is rotatably associated with the tape reel pin and includes a hub and a sleeve. The hub defines an axial bore. In one preferred embodiment, the tape reel assembly further includes opposing flanges connected to the hub. Regardless, the sleeve is disposed within the axial bore and forms a thrust surface. Finally, the storage tape is maintained by the hub. Upon final assembly, the thrust surface contacts the leading end of the tape reel pin, thereby bearing an axial load placed upon the tape reel assembly during use. In a preferred embodiment, the sleeve is metal-based and forms a journal bearing surface, thereby minimizing wear and tape reel wobble.

22 Claims, 5 Drawing Sheets

TAPE REEL ASSEMBLY WITH HUB SLEEVE FOR A DATA STORAGE TAPE CARTRIDGE

BACKGROUND OF THE INVENTION

The present invention relates to a tape reel assembly for a data storage tape cartridge. More particularly, it relates to a tape reel assembly including a hub sleeve configured to reduce tape reel wobble.

Data storage tape cartridges have been used for decades in the computer, audio and video fields. The data storage tape cartridge continues to be an extremely popular device for recording large volumes of information for subsequent retrieval and use.

A data storage tape cartridge generally consists of an outer shell or housing maintaining at least one tape reel assembly and a length of magnetic storage tape. The storage tape is wrapped about a hub portion of the tape reel assembly and is driven through a defined tape path by a driving system. The housing normally includes a separate cover and base, the combination of which forms an opening (or window) at a forward portion thereof for allowing access to the storage tape by a read/write of a tape drive. This interaction between storage tape and head may take place within the housing (for example, with a mid-tape load design), or the storage tape may be directed away from the housing to an adjacent area at which the read/write head is located (for example, with a helical drive design or a leader block design). Where the tape cartridge/drive system is designed to direct the storage tape away from the housing, the data storage tape cartridge normally includes a single tape reel assembly. Conversely, where the tape cartridge/drive system is designed to provide head/storage tape interaction within or very near the housing, a two- or dual-tape reel assembly configuration is typically employed.

With the dual-tape reel configuration, the tape path is defined by the location of the tape reels maintaining storage tape, as well as various tape guides positioned within the housing. Each tape reel is normally rotatably associated within the housing, and includes a hub and opposing flanges. The hub forms an outer, tape-winding surface about which the storage tape is wound. The flanges are disposed at opposite ends of the hub, and are spaced to approximate the height of the storage tape. Generally, the storage tape extends between the two hubs, along the tape guides. The tape guides are, in turn, strategically positioned within the housing such that at the cartridge window, the storage tape is parallel to a plane of the window.

In addition to facilitating proper positioning of the storage tape at a desired level in the area of the cartridge window, alignment of the tape reels, and in particular the respective hubs, plays a crucial role in minimizing tape wear. Tape reel "alignment" is normally understood to refer to spacing between the hub and the cover (or other section of the housing). If the hub or hubs are not properly spaced relative to the cover, the storage tape will not be optimally positioned along the tape guide(s). Over time, this undesirable interaction may lead to wrinkling or other forms of tape deterioration. In other words, a cross webbed tension is generated across the storage tape, possibly causing edge wear. Even further, tape reading errors may result at the high-tension side of the storage tape. Because current data writing/reading systems make use of nearly the entire width of the storage tape and utilize increasingly smaller data tracks along the storage tape width, it is imperative that every effort be made to ensure proper hub alignment.

The conventional technique for rotatably associating the tape reel within the housing is to press fit a straight tape reel pin into one section of the housing, such as the cover. Alternatively, the tape reel pin is press fitted into a separate base plate element that is secured within the housing. Regardless, the tape reel hub is formed to include an axial bore that receives the tape reel pin. The axial bore is slightly larger in diameter then the tape reel pin so that the hub can freely rotate about the tape reel pin. Further, the axial bore terminates at an internal, axial thrust surface. Upon final assembly, a leading end of the tape reel pin contacts or abuts the thrust surface. During use, the tape reel assembly is engaged by a tape drive mechanism and directed axially against the tape reel pin. Subsequently, the tape drive mechanism rotates the tape reel assembly about the stationary tape reel pin, with the thrust surface bearing the axial load placed upon the tape reel assembly. Notably, the hub is typically a molded plastic article, whereas the tape reel pin is stainless steel or other metal. The loaded, rotational contact between the thrust surface and the leading end of the tape reel pin can result in wear of the plastic hub. Over time, this wear can result in hub misalignment.

To overcome the above-described wearing issues presented by plastic hub/metal tape reel pin interaction, a recent tape reel assembly design modification includes a metal ball disposed between the axial thrust surface and the tape reel pin. For example, as described in U.S. Pat. No. 6,040,966, a stainless steel ball is placed within the hub bore to bear the axial load of the tape reel assembly relative to the pin. Effectively, the stainless steel ball rotates against the leading end of the tape reel pin, thereby minimizing hub wear. While this approach is highly effective in eliminating wear concerns, as well as efficiently compensating for variations in tape reel pin height, one potential issue has been identified. In particular, the hub, and thus the tape reel assembly, may "wobble" (e.g., deflect or otherwise deviate from axial alignment with the tape reel pin) slightly at the hub/ball interface. Normally, the degree of wobble is insignificant. However, with increased levels of wobble and/or more stringent operating parameters such as reduced-size data tracks, the hub wobble may lead to servo-tracking errors, tape wear, etc.

Data storage tape cartridges are important tools used to maintain vast amounts of information. With increasingly complex writing/reading and magnetic tape technology, design of the data storage tape cartridge must evolve to provide extremely accurate, consistent tape positioning. To this end, any potential error sources should be addressed. Therefore, a need exists for a tape reel assembly configured to reduce hub wobble and wear.

SUMMARY OF THE INVENTION

One aspect of the present invention relates to a data storage tape cartridge that includes a housing, a tape reel pin, a tape reel assembly, and a storage tape. The housing includes a first housing section and a second housing section. The tape reel pin extends in a generally perpendicular fashion relative to an interior surface of the first housing section. With this configuration, the tape reel pin provides a cylindrical side surface and terminates in a leading end. The tape reel assembly is rotatably associated with the tape reel pin and includes a hub and a sleeve. The hub defines an axial bore. In one preferred embodiment, the tape reel assembly further includes opposing flanges connected to the hub. Regardless, the sleeve is disposed within the axial bore and forms a thrust surface for contacting the leading end of the tape reel pin. Finally, the storage tape is maintained by the hub. During use, the tape reel assembly is driven such that the hub rotates about the tape reel pin, with the thrust surface of the sleeve bearing an axial load imparted on to the tape reel assembly in rotating contact with the leading end of the tape reel pin. In one preferred embodiment, the sleeve is formed from a metal such that wear, if any, caused by the loaded, rotational contact is minimal. Further, by controlling a bore tolerance of the sleeve, the opportunity for, and degree of, hub wobble is greatly reduced.

Another aspect of the present invention relates to a tape reel assembly for use with the data storage tape cartridge. The tape reel assembly includes a hub and a sleeve. The hub defines an axial bore. The sleeve is disposed within the axial bore and forms a thrust surface and a journal bearing surface. With this configuration, the tape reel assembly is positionable over a tape reel pin associated with the data storage tape cartridge, whereby the tape reel pin will extend axially within the sleeve. In particular, the axial thrust surface is configured to contact a leading end of the tape reel pin, whereas the journal-bearing surface establishes a journal bearing with the tape reel pin. In one preferred embodiment the tape reel assembly further includes opposing flanges. With this one preferred embodiment, the hub is positioned between the opposing flanges.

Yet another aspect of the present invention relates to data storage tape cartridge including a housing, a tape reel pin, a tape reel assembly and a storage tape. The housing includes a first housing section and a second housing section. The tape reel pin extends in a generally perpendicular fashion relative to an interior surface of the first housing section. With this configuration, the tape reel pin provides a cylindrical side surface and terminates in a leading end. The tape reel assembly is rotatably associated with the tape reel pin and includes a hub and a first insert piece. The hub defines an axial bore. The first insert piece is secured within the axial bore and forms an axial thrust surface for contacting the leading end of the tape reel pin. Finally, the storage tape is maintained by the hub. In one preferred embodiment, the tape reel assembly further includes a second insert piece forming a journal bearing surface corresponding with the cylindrical side surface of the tape reel pin to establish a journal bearing upon final assembly. In another preferred embodiment, the hub is positioned between opposing flanges. In connection with these two preferred embodiments, the first insert piece and one of the opposing flanges are integrally formed, and the second insert piece and the other one of the opposing flanges are integrally formed.

DETAILED DESCRIPTION OF THE PREFERRED EMBODIMENTS

Figure 1:
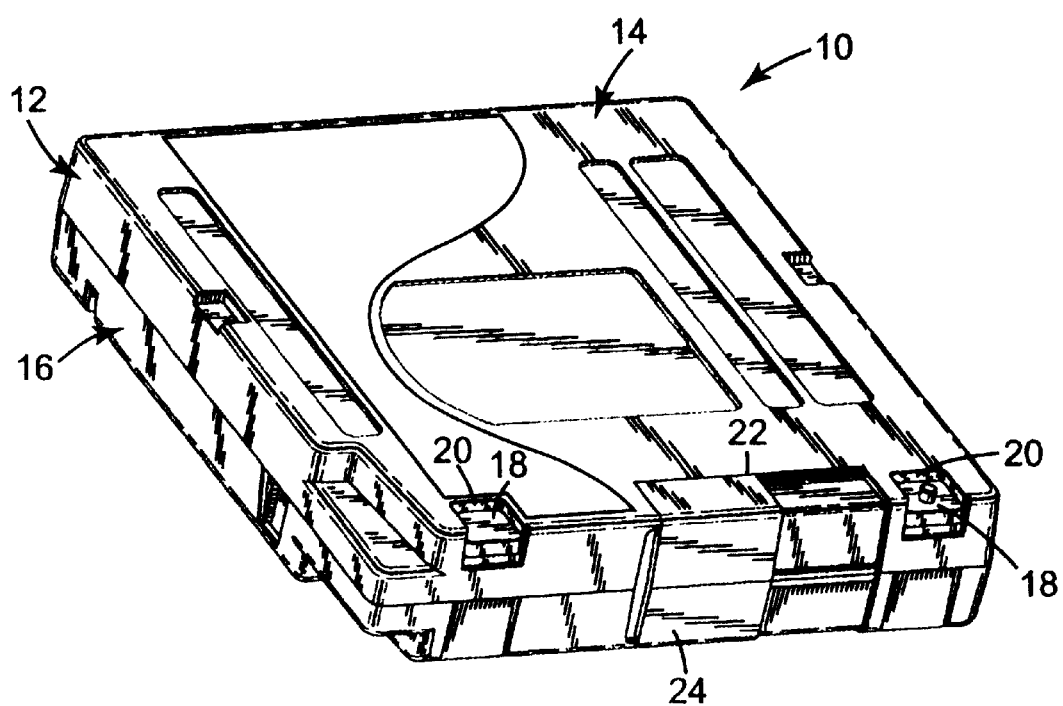
FIG. 1 is a perspective view of a data storage tape cartridge.

One preferred embodiment of a data storage tape cartridge 10 is shown in FIG. 1. Generally speaking, the data storage tape cartridge 10 includes a housing 12 formed by a first housing section 14 and a second housing section 16. The data storage tape cartridge 10 further includes a base plate 18, a portion of which is exposed through recesses 20 in the first housing section 14. Remaining components of the data storage tape cartridge 10 are described in greater detail below. However, with reference to FIG. 1, it should be understood that the first housing section 14 and the second housing section 16 are reciprocally mated to one another to form an enclosure within which the various other components, including the base plate 18, are maintained.

The housing 12 is sized in accordance with the industry-accepted tape drive form factors. Thus, the housing 12 can assume a form factor size of approximately 125 mm×110 mm×25 mm, although other form factors or dimensions are equally acceptable. Further, the first housing section 14 and the second housing section 16 combine to form a window 22 through which storage tape (not shown) otherwise maintained within the housing 12 can be accessed by a read/write head (not shown). To this end, the data storage tape cartridge 10 includes a door 24. The door 24 is slidably secured to the housing 12 such that the door 24 can be selectively moved to provide access to the window 22.

In a preferred embodiment, the first housing section 14 is a cover, whereas the second housing section 16 is a base. With reference to the orientation shown in FIG. 1, the data storage tape cartridge 10 is normally inserted into a tape drive (not shown) with the cover 14 facing upward. It should be recognized, however, that the data storage tape cartridge 10 can be oriented to any position. Thus, as used throughout the specification, directional terminology, such as "cover," "base," "upper," "lower," "top," "bottom," etc., are used for purposes of illustration only, and is in no way limiting. Further, the design of the data storage tape cartridge can be such that the first housing section 14 forms a base, whereas the second housing section 16 is a cover.

Figure 2:
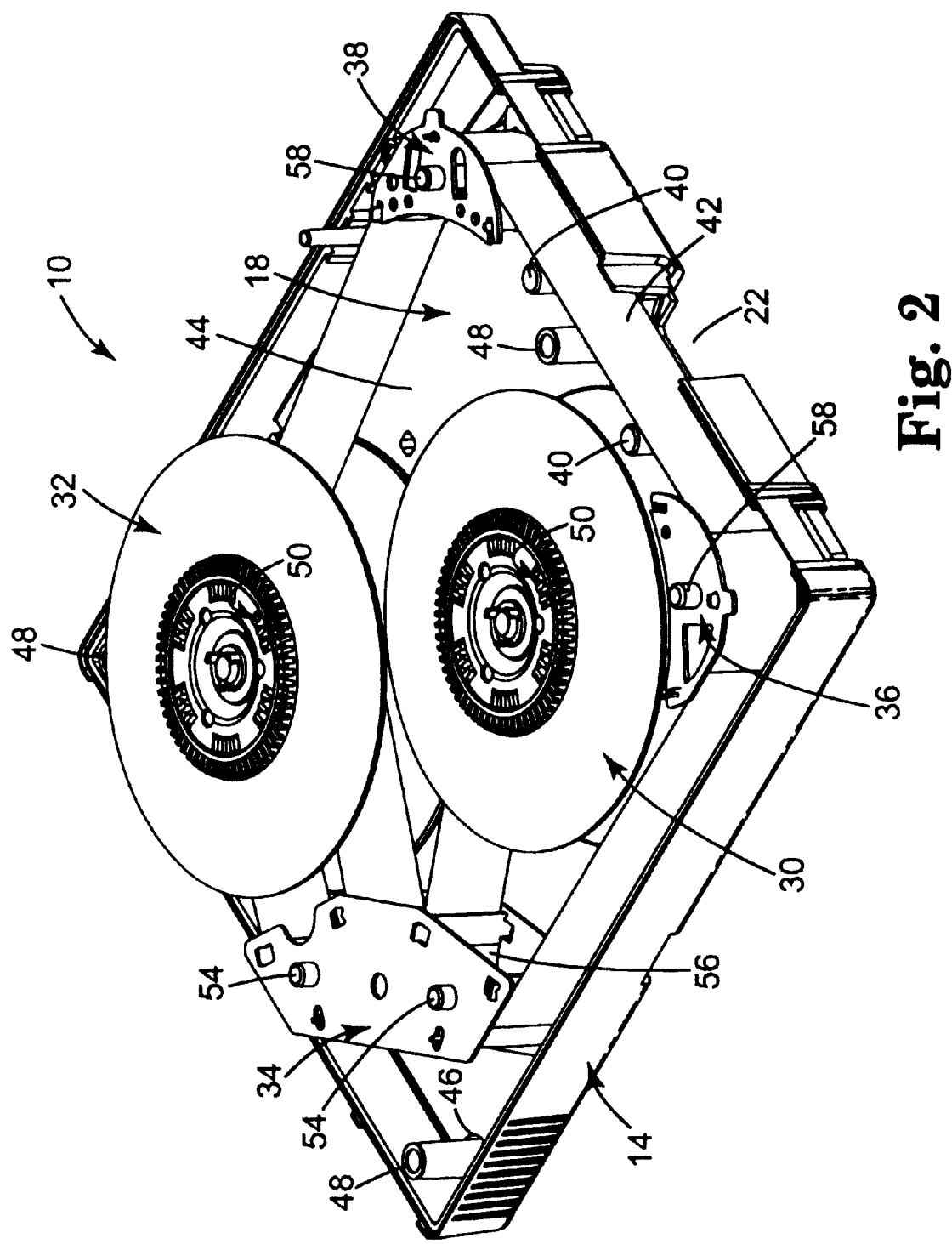
FIG. 2 is a perspective view of the data storage tape cartridge of FIG. 1 with a portion of a housing removed.

Remaining components of the data storage tape cartridge 10 are shown in FIG. 2. Notably, for ease of illustration, FIG. 2 depicts the first housing section 14 in an inverted position, and the second housing section 16 (FIG. 1) removed. With this orientation in mind, the data storage tape cartridge 10 includes the first housing section 14, the base plate 18, a first tape reel assembly 30, a second tape reel assembly 32, a first corner guide (or idler bearing) 34, a second corner guide 36, a third corner guide 38, pin guides (or head wrap pins) 40, and a storage tape 42. As described in greater detail below, the first tape reel assembly 30 and the second tape reel assembly 32 are rotatably secured about respective tape reel pins (not shown) extending from an interior surface 44 of the base plate 18. The remaining guides 34–40 are likewise secured to the interior surface 44 of the base plate 18.

In a preferred embodiment, the base plate 18 is made of a rigid material, such as aluminum. The base plate 18 is sized to nest within the first housing section 14 and includes recesses 46 (one of which is shown in FIG. 2) positioned to allow passage of various protrusions 48 formed by the first housing section 14. The protrusions 48 are configured to frictionally receive extensions (not shown) of the second housing section 16 (FIG. 1) to effectuate assembly of the housing sections 14, 16.

The first and second tape reel assemblies 30, 32 are described in greater detail below. In general terms, however, the tape reel assemblies 30, 32 are virtually identical and are positioned to rotate relative to the base plate 18 about the respective tape reel pins (not shown). It should be noted that the first and second tape reel assemblies 30, 32 each preferably include a toothed exterior surface 50. During use, tape drive chucks (not shown) engage the toothed exterior surface 50 for controlled rotation of the first and second tape reel assemblies 30, 32, respectively.

The first corner guide (or idler bearing) 34 is secured to the base 18 by pins 54 and includes a first arcuate surface 56 (the backside of which is shown partially in FIG. 2) and a second arcuate surface (not shown). The second corner guide 36 and the third corner guide 38 are similarly secured to the base plate 18 by pins 58 and likewise each provide an arcuate surface. The head wrap pins 40 are positioned on the base plate 18 adjacent the window 22 in the first housing section 14.

Finally, the storage tape 42 is preferably a magnetic tape of a type commonly known in the art. For example, the storage tape 42 can consist of a balanced polyethylene naphthalate (PEN)-based material coated on one side with a layer of magnetic material dispersed within a suitable binder system, and on the other side with a conductive material dispersed within a suitable binder system. Acceptable magnetic tape is available, for example, from Imation Corp. of Oakdale, Minn.

As shown in FIG. 2, the above components combine to define a tape path for the storage tape 42. In particular, the storage tape 42 extends from the first tape reel assembly 30, and articulates around the first arcuate surface 56 of the idler bearing 34 then extending to the second corner guide 36 and the third corner guide 38. Notably, the second corner guide 36 and the third corner guide 38 maintain a vertical, planar positioning of the storage tape 42 at the window 22, with the magnetic side of the storage tape 42 facing the window 22. The head wrap pins 40 are positioned at opposite sides of the window 22 to define a head wrap angle when the storage tape 42 is engaged by the read/write head (not shown) during use. From the third corner guide 38, the storage tape 42 articulates about an exterior portion of the second tape reel assembly 32 (including any storage tape 42 wrapped thereon), and extends to the second arcuate surface (not shown) of the idler bearing 34 and is finally wrapped about the second tape reel assembly 32.

As should be evident from the above description, the storage tape 42 is required to articulate through several radial turns when passing from the first tape reel assembly 30 to the second tape reel assembly 32. In this regard, the various guides 34–40 are preferably configured to maintain the storage tape 42 at a predetermined level, especially in the region of the window 22. However, unexpected variations in the position of the first and/or second tape reel assembly 30, 32 relative to the base plate 18 can lead to tape deterioration and possible errors during reading and/or writing operations. For example, edges of the storage tape 42 may be forced against the planar surfaces (or outer flanges) of the corner guides 34–38, resulting in undesirable edge wear or even a catastrophic wrinkle or crease in the storage tape 42. Additionally, a cross-webbed tension may be created across the storage tape 42, resulting in reading errors at the high-tension side of the storage tape 42. One possible cause of storage tape misalignment is variations rotational alignment (or "wobble") of the first and/or second tape reel assembly 30, 32 relative to the respective tape reel pins (not shown) during rotation thereof. Wobble of one or both of the tape reel assemblies 30, 32 is transferred to the storage tape 42, possibly resulting in a deviation from the preferred orientation of the storage tape 42 at the window 22. As the read/write head (not shown) interacts with the storage tape 42 at the window of 22, this deviation in tape orientation may result in reading/writing errors. The present invention overcomes this problem by providing a unique configuration for the first and second tape reel assemblies 30, 32.

Figure 3A:
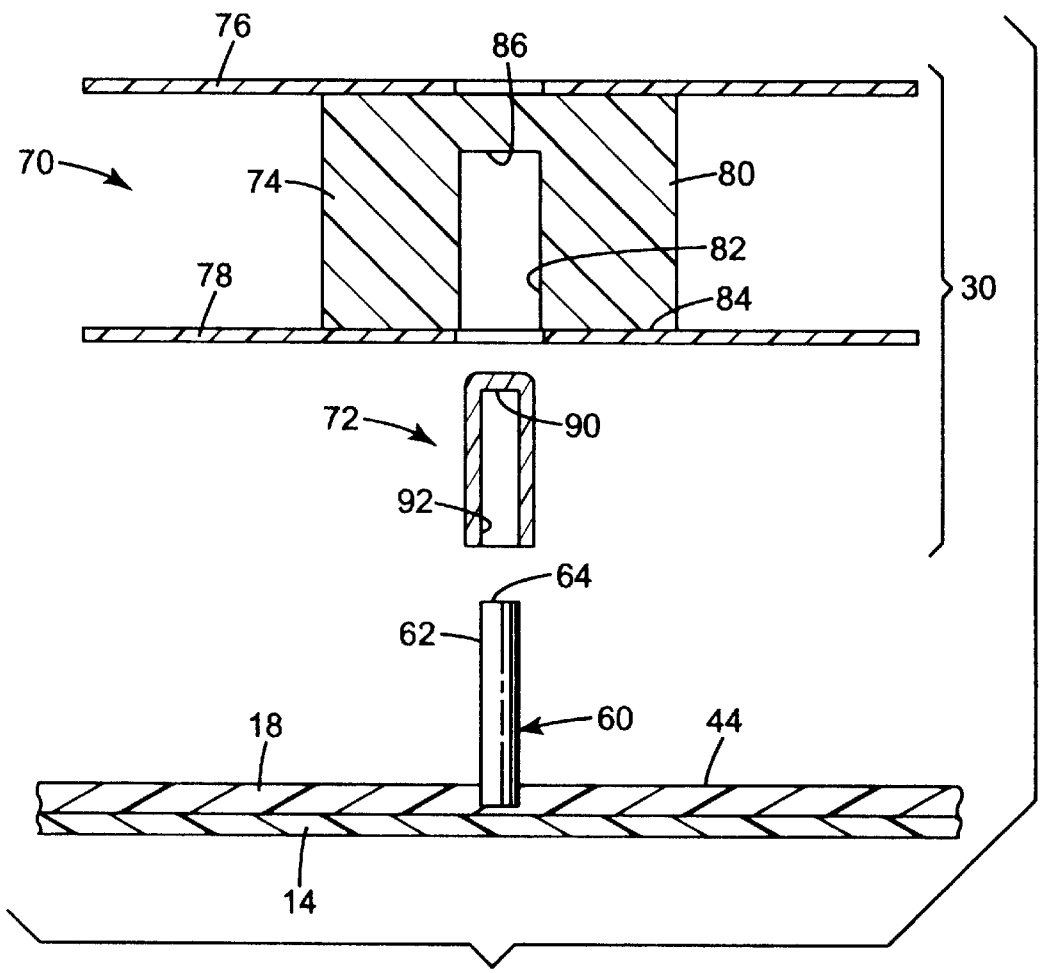
FIG. 3A is an enlarged, exploded, cross-sectional view of a portion of the data storage tape cartridge of FIG. 2, including a tape reel assembly in accordance with the present invention and a tape reel pin.

FIG. 3A shows a portion of the base plate 18 and the first housing section 14, as well as the first tape reel assembly 30 (exploded), in greater detail. While not shown, the second tape reel assembly 32 is preferably identical in construction and assembly to the base plate 18. As previously described, a tape reel pin 60 is attached to the base plate 18, extending in a generally perpendicular fashion from the interior surface 44. The tape reel pin 60 is typically stainless steel, and defines a cylindrical side surface 62 and terminates in a leading end 64. Notably, in an alternative embodiment, the tape reel pin 60 is secured directly to the first housing section 14. Regardless, the tape reel pin 60 extends in a generally perpendicular fashion relative to an interior surface of the first housing section 14.

The first tape reel assembly 30 includes a tape reel 70 and a sleeve 72. As described in greater detail below, the sleeve 72 is secured to the tape reel 70 and is sized to receive the tape reel pin 60.

In one preferred embodiment, the tape reel 70 consists of a hub 74 and opposing flanges, including an upper flange 76 and a lower flange 78. The terms "upper" and "lower" are with reference to the orientation shown in FIG. 3A. In one preferred embodiment, the hub 74 is manufactured separately from the opposing flanges 76, 78, which are subsequently attached to the hub 74 (the attachment is shown generally in FIG. 3A). Alternatively, the hub 74 and the opposing flanges 76, 78 can be integrally formed. Regardless, the hub 74 is positioned between the opposing flanges 76, 78, with the flanges 76, 78 being spaced in accordance with a height of the storage tape 42 (FIG. 2). Notably, where the cartridge 10 (FIG. 1) is a belt driven design known in the art, the opposing flanges 76, 78 are not necessary to maintain the storage tape 42, and can, therefore, be eliminated. In a broadest sense, then, the tape reel 70 consists of the hub 74 alone.

The hub 74 is preferably made of a relatively rigid plastic material, such as polycarbonate, although other materials known in the art are equally acceptable. The hub 74 is formed (e.g., molded) to define a tape winding surface 80 and an axial bore 82. The axial bore 82 extends from an end 84 of the hub 74, terminating at a radial surface 86. The axial bore 82 is formed to have a diameter greater than that of the tape reel pin 60 and is sized to receive the sleeve 72, as described below.

The opposing flanges 76, 78 are similarly preferably made of a relatively rigid plastic material, such as polycarbonate, although other materials known in the art are equally acceptable. In one preferred embodiment, the tape winding surface 80 of the hub 74 has a diameter of approximately 0.9 inch (23 mm), whereas the upper and lower flanges 76, 78 have outer diameters of approximately 2.4 inches (61 mm). It will be recognized, however, that virtually any other size, either greater or smaller, is equally acceptable.

The sleeve 72 is sized to fit within the axial bore 82 and forms a thrust surface 90, and a journal bearing surface 92 and a trailing end 94. Relative to the orientation of FIG. 3A, the thrust surface 90 extends radially relative to a central axis of the sleeve 72. In one preferred embodiment, the thrust surface 90 is substantially planar and is configured to contact the leading end 64 of the tape reel pin 60 upon final assembly. Alternatively, and as described in greater detail below, other configurations are equally acceptable. The journal bearing surface 92 extends in a vertical fashion (relative to the orientation of FIG. 3A) and preferably corresponds in shape and size with the cylindrical side surface 62 defined by the tape reel pin 60. In this regard, the journal bearing surface 92 is preferably substantially uniform, defining a diameter that is slightly greater than (on the order of 0.0005 inch or 0.0127 mm) a diameter of the cylindrical side surface 62.

The sleeve 72 is preferably formed from a metallic material having desirable frictional characteristics relative to the stainless steel tape reel pin 60. For example, in one preferred embodiment, the sleeve 72 is formed from a copper alloy. By implementing a metal (such as a metal alloy) for the sleeve 72, the journal bearing surface 92 can be formed and held to a more exact bore tolerance than otherwise realized with plastic molding. As a point of reference, and in one preferred embodiment, the tape reel pin 60 has a diameter of 0.125 inch (3.175 mm) and the sleeve 72 is formed such that the journal bearing surface 92 defines a diameter of approximately 0.1253 inch (3.183 mm). This is in contrast to prior art designs that do not include the sleeve 72, whereby the axial bore 82 (otherwise required to be in direct contact with the tape reel 60) is formed to a diameter of 0.126 inch (3.20 mm). As evidenced by this one example, the sleeve 72 can be formed to a much tighter tolerance relative to a diameter of the tape reel pin 60, as the metal sleeve 72 will not swell or otherwise dimensionally deviate during a conventional molding process used to make the plastic-based hub 74. Further, the sleeve 72 can be formed by a deep drawing technique that, as known in the art, is a high volume, low cost process.

Figure 3B:
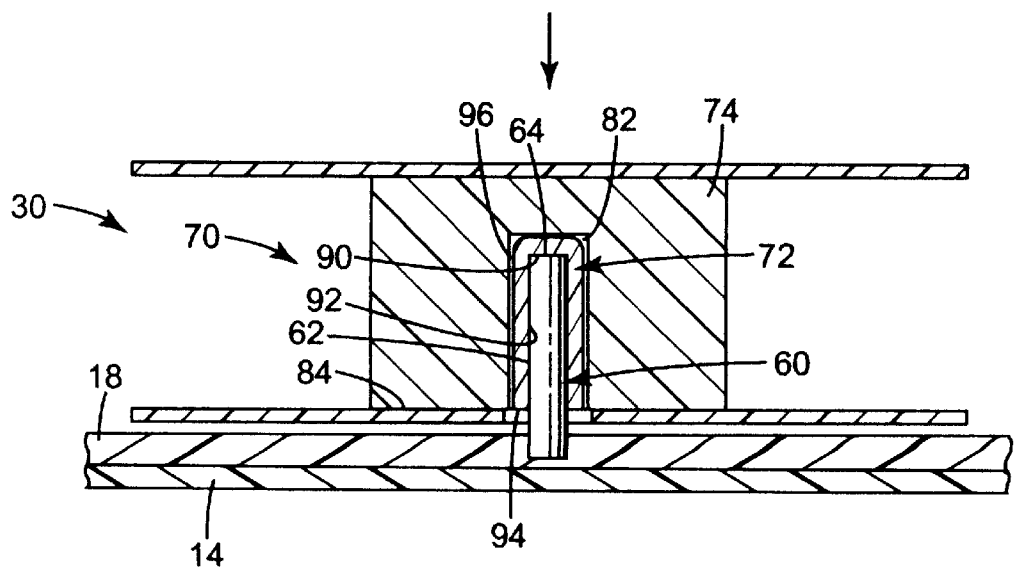
FIG. 3B is an enlarged, cross-sectional view of FIG. 3A, depicting the tape reel assembly assembled to the tape reel pin.

With reference to FIG. 3B, the tape reel assembly 30 is constructed by securing the sleeve 72 within the axial bore 82 of the hub 74. For example, the hub 74 can be molded about the sleeve 72. Alternatively, the sleeve 72 can be pressed-fitted into the axial bore 82, thereby secured to the hub 74 via a friction fit. Even further, other mounting techniques, including use of an adhesive, can be employed. In one preferred embodiment, the sleeve 72 is assembled to the hub 74 such that the trailing end 94 of the sleeve 72 is aligned with the end 84 of the hub 74. By forming the sleeve 72 to have a known height, then, a desired relationship between the tape reel pin 60 and the tape reel 70 can be achieved. Regardless, upon assembly of the tape reel 70 over the tape reel pin 60, a small spacing or clearance 96 region (exaggerated in FIG. 3B for purposes of illustration) is preferably established between the journal bearing surface 92 of the sleeve 72 and the cylindrical side surface 62 of the tape reel pin 60. In a preferred embodiment, a lubricant (not shown), such as a non-migrating grease, is disposed within the clearance region 96. Introduction of the lubricant results in a journal bearing between the sleeve 72 and the tape reel pin 60.

Upon final assembly, the leading end 64 of the tape reel pin 60 contacts the thrust surface 90 of the sleeve 72. During use, a tape drive coupling (not shown) engages and places an axial load on the tape reel assembly 30, imparting an axial load, represented by the arrow in FIG. 3B. The thrust surface 90 of the sleeve 72 serves to bear the axial load against the tape reel pin 60. Subsequent rotation of the tape reel assembly 30 causes the thrust surface 90 to rotate against the leading end 64 of the tape reel pin 60. Because the sleeve 72 is preferably a metal (including a metal alloy) having optimal frictional characteristics relative to the metal tape reel pin 60, the thrust surface 90 will experience little, if any, wear. That is to say, unlike prior configurations in which a plastic-based hub is in direct contact with a steel tape reel pin, the metal-based sleeve 72 exhibits long term integrity. In addition, due to the extremely small spacing or clearance region 96 between the journal bearing surface 92 and the cylindrical side surface 62, in conjunction with the lubricant (not shown), wobbling of the tape reel 70 relative to the tape reel pin 60 is virtually eliminated.

Figure 4:
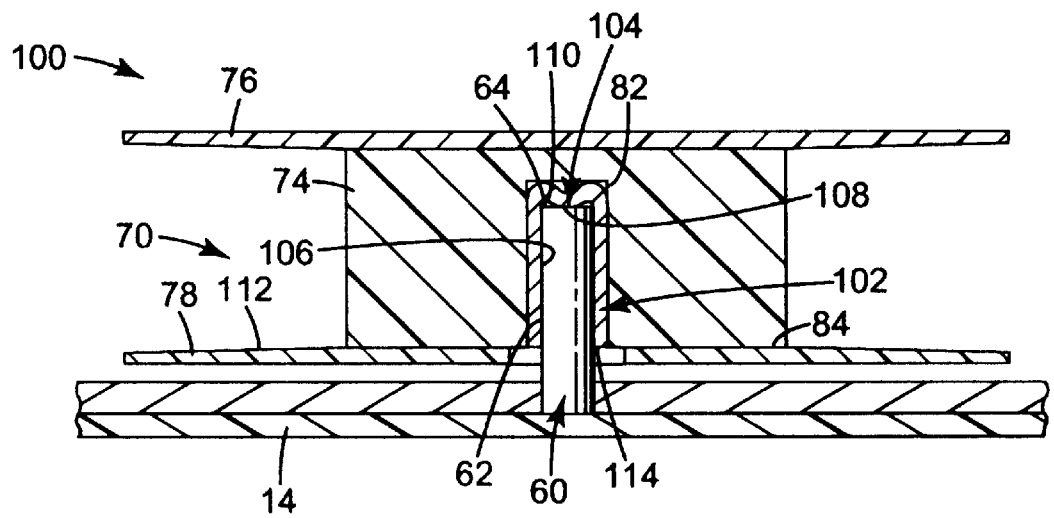
FIG. 4 is an enlarged, cross-sectional view of an alternative tape reel assembly in accordance with the present invention assembled to a tape reel pin.

The above-described tape reel assembly 30 provides but one example of an acceptable sleeve. That is to say, the sleeve 72 can be modified from the form shown in FIGS. 3A and 3B to potentially enhance assembly and/or performance characteristics. For example, an alternative embodiment tape reel assembly 100 is depicted in FIG. 4 in conjunction with other components of a data storage tape cartridge previously described, including the tape reel pin 60. The tape reel assembly 100 is similar to the tape reel assembly 30 (FIGS. 3A and 3B) previously described, includes the tape reel 70 and a sleeve 102. The tape reel 70, once again, includes the hub 74 and the opposing flanges 76, 78. Finally, the hub 74 forms the axial bore 82 and the end 84.

The sleeve 102 is similar to the sleeve 72 (FIGS. 3A and 3B) previously described, and forms a thrust surface 104 and a journal bearing surface 106. The journal bearing surface 106 is similar to the journal bearing surface 92 (FIGS. 3A and 3B) previously described, and is sized to have a uniform diameter slightly greater than a diameter of the tape reel pin 60. In contrast to the sleeve 72, the sleeve 102 is preferably formed such that the thrust surface 104 is non-planar, defined by a contact section 108 and an offset section 110. As shown in FIG. 4, the contact section 108 extends downwardly from the offset section 110, and is preferably convex. Upon assembly over the tape reel pin 60, the contact section 108 serves as a bearing surface against the leading end 64 of the tape reel pin 60. By preferably forming the contact section 108 to be convex, a point contact between the thrust surface 104 and the leading end 64 of the tape reel pin 60 is effectively established. This point contact will minimize tape reel wobble by bearing (or loading) the tape reel assembly 100 directly on the axis of rotation.

In addition, the point contact will allow for increased control of the assembled distance between the leading end 64 of the tape reel pin 60 relative to an inner surface (or datum) 112 of the lower flange 78 (and the upper flange 76). In other words, use of a metal facilitates formation of the sleeve 102 within tight dimensional tolerances, such that a consistent, known height is established between the contact section 108 and a trailing end 114 of the sleeve 102. A distance between the end 84 of the hub 74 and the datum 112 is also known, and readily reproducible. Thus, by assembling the sleeve 102 such that the trailing end 114 and the end 84 are aligned, a consistent, known distance is established between the contact section 108 and the datum 112. Following placement over the tape reel pin 60, this same, known distance thus is established relative to the leading end 64 of the tape reel pin 60, such that the distance between the leading end 64 and the datum 112 is controlled. Because the datum 112 dictates a location of the storage tape 42 (FIG. 2), the controlled distance provided by the contact section 108 enhances overall tape alignment. This is in contrast to prior art tape reel assemblies that rely upon direct interface with the plastic hub 74 material to establish the tape reel pin/ datum dimension(s). Because the hub will deviate (e.g., swell) in various dimensions during molding, it is virtually impossible to provide a consistent, exact dimensional distance between the tape reel pin 60 and the datum 112 with prior designs.

Finally, as shown in FIG. 4, upon final assembly, the offset section 110 is spaced from the leading end 64 of the tape reel pin 60. In a preferred embodiment, a lubricant (not shown) is disposed within the open region established between the offset section 110 and the leading end 64. Effectively, then, the open region serves as lubricant reservoir that can provide sufficient lubricant to all bearing surfaces (e.g., between the thrust surface 104 and the leading end 64, as well as the journal bearing surface 106 and the cylindrical side surface 62).

Figure 5:
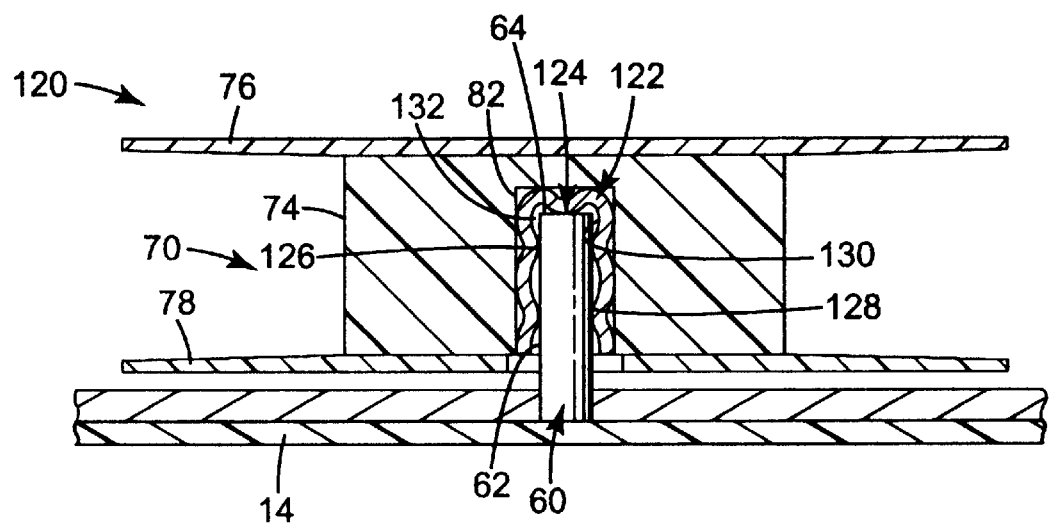
FIG. 5 is an enlarged, cross-sectional view of another alternative tape reel assembly in accordance with the present invention assembled to a tape reel pin.

Another alternative embodiment tape reel assembly 120 is shown in FIG. 5 in conjunction with portions of a data storage tape cartridge, including the tape reel pin 60 as previously described. The tape reel assembly 120 is similar to the tape reel assemblies previously described and includes the tape reel 70 and a sleeve 122. Once again, the tape reel 70 includes the hub 74, forming an axial bore 82, and the opposing flanges 76, 78. As shown in FIG. 5, the sleeve 122 is secured within the axial bore 82 and provides a thrust surface 124 and a journal bearing surface 126. Similar to the sleeve 102 described with reference to FIG. 4, the thrust surface 124 is preferably non-planar. Additionally, the journal bearing surface 126 also is non-planar. More particularly, the sleeve 122 is preferably crimped or otherwise formed such that the journal bearing surface 126 includes contact sections 128 and offset sections 130. The contact sections 128 extend radially inwardly from the offset sections 130 to a define diameter approximating a diameter of the tape reel pin 60. Upon final assembly, then, the contact sections 128 of the journal bearing surface 126 contact or otherwise engage the cylindrical side surface 62 of the tape reel pin 60. Conversely, the offset sections 130 are spaced from the cylindrical side surface 62. With this configuration, a lubricant 132 can be disposed within the open regions established between the offset sections 130 and the cylindrical side surface 62. Because the sleeve 122 is preferably a metal or metal alloy, the dimensions associated with the journal bearing surface 126, and in particular the contact sections 128, can be exactingly controlled. As a result, the direct interface between the contact sections 128 and the cylindrical side surface 62 further minimizes possible tape reel wobble. In the preferred embodiment, the interface area between the contact sections 128 and the cylindrical side surface 62 is very small so as to allow trapped air to escape quickly from the tape reel assembly 120 interior.

Figure 6:
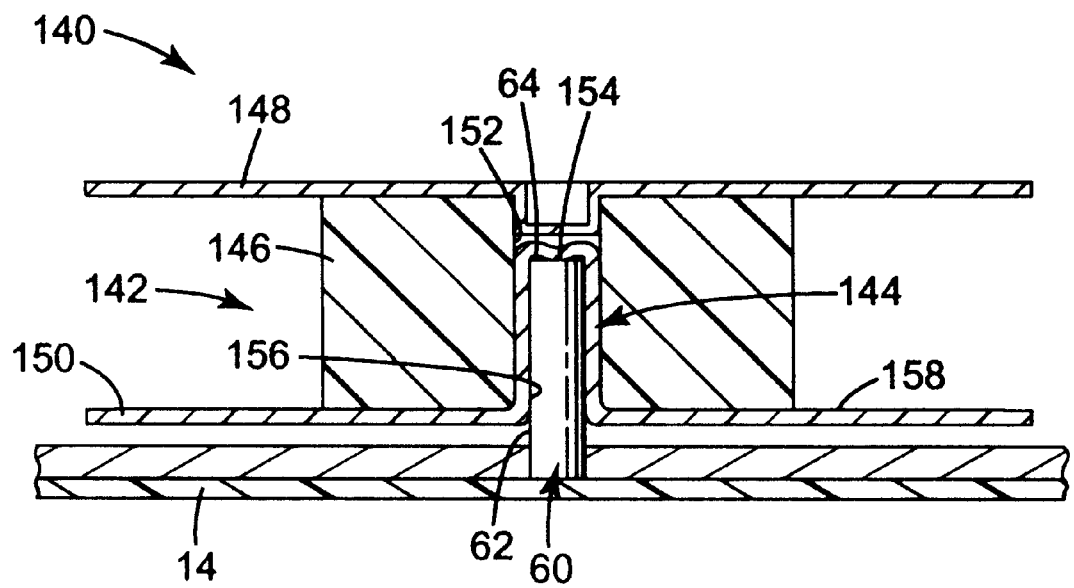
FIG. 6 is an enlarged, cross-sectional view of another alternative tape reel assembly in accordance with the present invention assembled to a tape reel pin.

Yet another alternative embodiment tape reel assembly 140 is shown in FIG. 6 in conjunction with other components of a data storage tape cartridge including the tape reel pin 60 as previously described. The tape reel assembly 140 includes a tape reel 142 and a sleeve 144. The tape reel 142 includes a hub 146, an upper flange 148 and a lower flange 150. As with previous embodiments, the hub 146 forms an axial bore 152 within which the sleeve 144 is secured.

The sleeve 144 is similar to previous embodiments, and forms a thrust surface 154 and a journal bearing surface 156. In this regard, the thrust surface 154 may be planar as shown in FIG. 6 or may alternatively be non-planar as previously described with reference to FIGS. 4 and 5. Similarly, the journal bearing surface 156 may be uniform as depicted in FIG. 6 or may alternatively be non-uniform as otherwise described with reference to FIG. 5. Regardless, unlike previous embodiments, the sleeve 144 is integrally formed with the lower flange 150. That is to say, the sleeve 144 and the lower flange 150 are formed as a unitary body, preferably from a metal (such as a metal alloy). The so-formed body is subsequently secured to the hub 146, with the sleeve 144 extending within the axial bore 152. Alternatively, the hub 146 can be molded about the sleeve 144. Regardless, the resulting assembly is placed over the tape reel pin 60 such that the leading end 64 contacts the thrust surface 154 and a journal bearing is established between the cylindrical side surface 62 and the journal bearing surface 156. By integrally forming the sleeve 144 and the lower flange 150, the dimension between the leading end 64 of the tape reel pin 60 and an inner surface or datum 158 of the lower flange 150 (or the upper flange 148) is better controlled as all dimensional variations will come from a single part. Additionally, a cost savings is recognized as compared to previous embodiments whereby one part and an assembly process step are eliminated. Finally, the flanges 148, 150 can be accurately centered or concentric relative to the hub 146.

Figure 7:
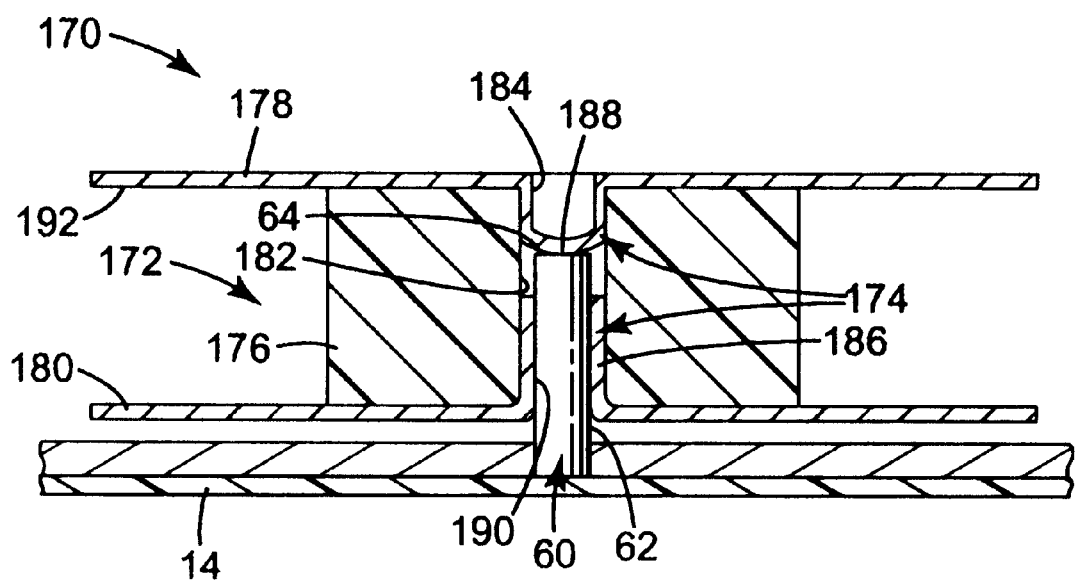
FIG. 7 is an enlarged, cross-sectional view of another alternative tape reel assembly in accordance with the present invention assembled to a tape reel pin.

Yet another alternative embodiment tape reel assembly 170 is depicted in FIG. 7 in conjunction with other portions of a data storage tape cartridge including the tape reel pin 60 as previously described. The tape reel assembly 170 includes a tape reel 172 and a sleeve 174. The sleeve 174 is assembled to the tape reel 172 as described in greater detail below.

The tape reel 172 includes a hub 176, an upper flange 178, and a lower flange 180. As with previous embodiments, the hub 176 forms an axial bore 182. As shown in FIG. 7, the axial bore 182 preferably extends through an entire height of the hub 176.

Unlike previous embodiments, the sleeve 174 includes two separate components including a first piece 184 and a second piece 186. The first piece 184 forms a thrust surface 188. As with previous embodiments, the thrust surface 188 is configured to contact the leading end 64 of the tape reel pin 60 upon final assembly, bearing an axial load placed on the tape reel assembly 170 during use. In this regard, the thrust surface 188 may be convex as shown in FIG. 7, but alternatively may be planar or assume other shapes. Conversely, the second piece 186 forms a journal bearing surface 190. As with previous embodiments, the journal bearing surface 190 corresponds with the cylindrical side surface 62 of the tape reel pin 60, and can be uniform as shown in FIG. 7 or assume other non-uniform configurations. Preferably, the journal bearing surface 190 has a diameter slightly greater than a diameter of the cylindrical side surface 62, establish a small gap or open region (not shown) therebetween. Regardless, in conjunction with a lubricant (not shown), the journal bearing surface 190 establishes a journal bearing with the cylindrical side surface 62 during rotation of the tape reel assembly 170.

As shown in FIG. 7, the first piece 184 and the upper flange 178 are integrally formed, preferably from a metal (including a metal alloy). Similarly, the second piece 186 and the lower flange 180 are integrally formed, preferably from a metal material. In addition to providing high strength, low wear surfaces, the sleeve 174, and in particular the first piece 184 provides for increased dimensional control upon final assembly of the leading end 64 of the tape reel pin 60 relative to an inner surface or datum 192 of the upper flange 178. More particularly, by forming the upper flange 178/first piece 184 as a unitary component from a metal, a relatively precise dimension between the thrust surface 188 and the datum 192 can be established. Subsequently, upon assembly over the tape reel pin 60, this same, precise spacing between the leading end 64 and the datum 192 is similarly established, thereby leading to improved storage tape alignment as dictated by the datum 192.

The tape reel assembly with hub sleeve for use with a data storage tape cartridge of the present invention provides a marked improvement over previous designs. For example, the sleeve can be formed within tight dimensional tolerances, thereby reducing the degree of tape reel wobble experienced during use. In addition, by employing a metal material for the sleeve, little, if any, wear will occur at the sleeve/tape reel pin interface.

Although specific embodiments have been illustrated and described herein for purposes of description of the preferred embodiment, workers skilled in the art will recognize that changes may be made in form and detail without departing from the spirit and scope of the present invention. For example, the data storage tape cartridge has been described as preferably including a base plate nesting within the first housing section (or cover). The base plate, however, is not a required element. Instead, the tape reel pin can be secured directly to the interior surface of the first or second housing section. Similarly, although the data storage tape cartridge has been shown as preferably incorporating a dual tape reel design, the tape reel assembly of the present invention applies equally as well to a single tape reel cartridge. Additionally, while the tape reel assembly has been depicted as preferably including opposing flanges, these components can be eliminated, such as with a belt-driven cartridge design.

What is claimed is:

1. A data storage tape cartridge comprising:
a housing including a first housing section and a second housing section;
a tape reel pin extending in a generally perpendicular fashion relative to an interior surface of the first housing section, the tape reel pin defining a cylindrical side surface and terminating in a leading end;
a tape reel assembly rotatably associated with the tape reel pin, the tape reel assembly comprising:
a hub defining an axial bore,
a sleeve disposed within the axial bore, the sleeve forming a non-planar thrust surface for contacting the leading end of the tape reel pin; and
a storage tape maintained by the hub.

2. The data storage tape cartridge of claim 1, wherein the hub is plastic and the sleeve is metal.

3. The data storage tape cartridge of claim 1, wherein the thrust surface includes a contact section and an offset section such that upon final assembly, the contact section contacts the leading end and the offset section is spaced from the leading end.

4. The data storage tape cartridge of claim 3, wherein the contact section is convex.

5. The data storage tape cartridge of claim 3, further comprising:
a lubricant disposed within a space between the leading end and the offset section.

6. The data storage tape cartridge of claim 1, wherein the sleeve defines a journal bearing surface corresponding with the cylindrical side surface of the tape reel pin.

7. The data storage tape cartridge of claim 6, wherein the journal bearing surface is substantially uniform defining a diameter slightly greater than a diameter of the cylindrical side surface.

8. The data storage tape cartridge of claim 7, further comprising:
a lubricant disposed within a space between the journal bearing surface and the cylindrical side surface for establishing a journal bearing.

9. The data storage tape cartridge of claim 6, wherein the journal bearing surface is non-uniform defining a contact section and an offset section such that upon final assembly, the contact section contacts the cylindrical side surface and the offset section is spaced from the cylindrical side surface.

10. The data storage tape cartridge of claim 1, wherein the tape reel assembly further comprises opposing flanges connected to the hub.

11. The data storage tape cartridge of claim 10, wherein the sleeve and one of the opposing flanges are integrally formed.

12. The data storage tape cartridge of claim 10, wherein the sleeve includes a first piece defining a thrust surface and a second piece defining a journal bearing surface, and further wherein the first piece is integrally formed with one of the opposing flanges and the second piece is integrally formed with the other one of the opposing flanges.

13. A tape reel assembly for use with a data storage tape cartridge comprising:
a hub defining an axial bore; and
a sleeve disposed within the axial bore, the sleeve forming a non-planar thrust surface and a journal bearing surface.

14. The tape reel assembly of claim 13, wherein the hub is plastic and the sleeve is metal.

15. The tape reel assembly of claim 13, wherein the journal bearing surface defines a non-uniform diameter.

16. The tape reel assembly of claim 13, further comprising opposing flanges, wherein the hub is positioned between the opposing flanges.

17. The tape reel assembly of claim 16, wherein the sleeve and one of the opposing flanges are integrally formed.

18. The tape reel assembly of claim 16, wherein the sleeve includes a first piece defining the thrust surface and a second piece defining the journal bearing surface, and further wherein the first piece is integrally formed with one of the opposing flanges and the second piece is integrally formed with the other one of the opposing flanges.

19. A data storage tape cartridge comprising:
a housing including a first housing section and a second housing section;
a tape reel pin extending in a generally perpendicular fashion relative to an interior surface of the first housing section to provide a cylindrical side surface and terminating in a leading end;
a tape reel assembly rotatably associated with the tape reel pin, the tape reel assembly comprising:
a hub defining an axial bore,
a first insert piece secured within the axial bore, the insert piece defining a thrust surface for contacting the leading end of the tape reel pin and bearing an axial load placed upon the tape reel assembly;
a second insert piece forming a journal bearing surface corresponding with the cylindrical side surface of the tape reel pin; and
a storage tape maintained by the hub.

20. The data storage tape cartridge of claim 19, wherein the first insert piece further defines a journal bearing surface corresponding with the cylindrical side surface of the tape reel pin.

21. The data storage tape cartridge of claim 19, wherein the tape reel assembly further comprises opposing flanges, and further wherein the hub is positioned between the opposing flanges.

22. The data storage tape cartridge of claim 21, wherein the first insert piece and one of the opposing flanges are integrally formed, and further wherein the second insert piece and the other one of the opposing flanges are integrally formed.

* * * * *